(12) United States Patent
Starobinski et al.

(10) Patent No.: US 8,770,339 B2
(45) Date of Patent: Jul. 8, 2014

(54) SILENCER FOR AN AUXILIARY POWER UNIT OF AN AIRCRAFT

(71) Applicant: Airbus Operations GmbH, Hamburg (DE)

(72) Inventors: Rudolf Starobinski, Hamburg (DE); Matthias Siercke, Hamburg (DE)

(73) Assignee: Airbus Operations GmbH (DE)

( * ) Notice: Subject to any disclaimer, the term of this patent is extended or adjusted under 35 U.S.C. 154(b) by 90 days.

(21) Appl. No.: 13/628,181

(22) Filed: Sep. 27, 2012

(65) Prior Publication Data

US 2013/0081900 A1 Apr. 4, 2013

Related U.S. Application Data

(60) Provisional application No. 61/541,409, filed on Sep. 30, 2011.

(30) Foreign Application Priority Data

Sep. 30, 2011 (DE) .......................... 10 2011 114 705

(51) Int. Cl.
*F02K 1/04* (2006.01)
*F02K 1/82* (2006.01)

(52) U.S. Cl.
USPC ............. 181/213; 244/1 N; 415/119; 181/214

(58) Field of Classification Search
CPC B64D 33/06; B64D 2033/0206; F02K 1/827; F02C 7/045; G10K 11/172

USPC ......... 181/210, 211, 212, 213, 250, 266, 273, 181/276, 292; 244/1 N; 415/119; 60/770

See application file for complete search history.

(56) References Cited

U.S. PATENT DOCUMENTS

| 4,137,992 A | 2/1979 | Herman |
| 2004/0065504 A1 | 4/2004 | Daniels |
| 2011/0303786 A1 | 12/2011 | Starobinski et al. |

FOREIGN PATENT DOCUMENTS

| DE | 102009006579 A1 | 8/2010 |
| WO | 2010040837 A2 | 4/2010 |

*Primary Examiner* — Jeremy Luks
(74) *Attorney, Agent, or Firm* — Lerner, David, Littenberg, Krumholz & Mentlik, LLP

(57) ABSTRACT

A silencer for an auxiliary power unit of an aircraft includes an inlet, an outlet, a housing, and a flow channel of a porous material, arranged in the housing. Between the housing and the flow channel an intermediate space is created, which space is divided by at least one outer partition into outer cells arranged around the flow channel. A central body includes a casing that is permeable to gas at least in some regions and that is arranged in the interior of the silencer. The central body includes inner partitions dividing the central body into inner cells. The resonance frequency of the inner cells corresponds to the natural frequency of the first radial mode in a channel formed between the central body and the inner surface of the inlet. In this manner particularly good sound attenuation is achieved with a compact installation space of a silencer.

11 Claims, 3 Drawing Sheets

SILENCER FOR AN AUXILIARY POWER UNIT OF AN AIRCRAFT

CROSS-REFERENCE TO RELATED APPLICATIONS

The present application claims the benefit of the filing date of U.S. Provisional Patent Application No. 61/541,409, filed Sep. 30, 2011 and of German Patent Application No. 10 2011 114 705.9, filed Sep. 30, 2011, the disclosures of which are hereby incorporated herein by reference.

TECHNICAL FIELD

The invention relates to a silencer for an auxiliary power unit of an aircraft with a housing and a flow channel arranged in the housing, wherein the space between the flow channel and the housing is divided into several cells. The invention further relates to the use of a silencer for an auxiliary power unit in an aircraft and to an aircraft comprising at least one auxiliary power unit and at least one silencer arranged on said auxiliary power unit.

BACKGROUND OF THE INVENTION

Commercial aircraft frequently comprise an auxiliary power unit (also named "APU" for "Auxiliary Power Unit") that is often situated in a tail cone of the aircraft and that is designed on the basis of a flow machine, for example a turbojet engine, that supplies the aircraft with compressed air and electrical energy. In such an arrangement the exhaust gas arising during operation exits through an exhaust gas outlet in the region of the tail cone into the surroundings of the aircraft so that to the largest extent possible under all conditions encountered both during a stopover of the aircraft on the ground and during flight operations none of the tail planes of the aircraft is in contact with the hot exhaust gas stream. Because of the frequent operation of the auxiliary power unit while the aircraft is situated on the ground, its noise may represent a noise nuisance to the airport and its environment. In order to reduce noise development on the ground, silencers are used that are coupled to the exhaust gas outlet of the auxiliary power unit and that correspondingly silence the exhaust gas noise.

From WO 2010/040837 A1 silencers for auxiliary power units of an aircraft are known whose basic design is particularly taken into account below.

A known silencer for an auxiliary power unit comprises a flow channel that connects an exhaust gas inlet to an exhaust gas outlet and that is enclosed by a housing. The volume between the housing and the flow channel is divided by partitions into several cells, wherein the majority of the partitions are arranged in an equidistant manner along the flow channel. Usually the flow channel comprises a metallic felt-like material that withstands the temperature and corrosive nature of the exhaust gas while at the same time being porous. This makes it possible not only to feed the exhaust gas through the flow channel along its extension in the housing, but also to bring about a changing flow across the aforesaid through the wall material of the flow channel into the individual cells so that during the passage through the wall material of the flow channel acoustic energy is converted to heat as a result of friction, and in this manner the exhaust noise is reduced.

In the design of a corresponding silencer, in particular in aircraft, the available installation space is severely limited so that in order to increase the extent of sound attenuation the outer dimensions of the silencer can practically not be enlarged but should always be kept constant or at least on the lowest-possible level. With the existing design methods of silencers for auxiliary power units of an aircraft, improvements to the extent of sound attenuation cannot be expected without further ado without the dimensions of the silencer being enlarged.

BRIEF SUMMARY OF THE INVENTION

An aspect of the invention proposes a silencer for an auxiliary power unit of an aircraft in which improved sound attenuation can be achieved without increasing the outer dimensions of the silencer. The silencer is as compact as possible while still providing effective sound attenuation in a wide frequency range.

In an advantageous embodiment the silencer comprises an inlet, an outlet, a housing and a flow channel, arranged in the housing, comprising a porous wall material. Between the housing and the flow channel an intermediate space is created that by means of one or several outer partitions is divided into outer cells that are arranged around the flow channel. The silencer further comprises a central body with a casing that at least in some regions is permeable to gas, which casing is arranged in the interior of the silencer, at least in some regions projects into the inlet and comprises inner partitions that divide the central body into inner cells. In this arrangement the resonant frequency of the inner cells corresponds to the natural frequency of the first radial mode in a channel formed between the casing of the central body and the inner surface of the inlet.

Exhaust gas entering through the inlet into the flow channel moves within the flow channel to the outlet where it exits into the surroundings of the aircraft. The wall material of the silencer according to an embodiment of the invention, as is also known from the state of the art, is porous, thus allowing an alternating flow through a wall of the flow channel. During the flow through the porous wall material, some of the acoustic energy is converted to heat so that a certain noise reduction occurs. By way of the outer cells distributed along the silencer this noise reduction is repeated several time so that in the region of the outlet already very good sound attenuation is achieved. It is not mandatory for the distribution of the outer partitions to be equidistant; instead, it can be varied in one or several intervals as shown in WO 2010/040837 A1.

Sound attenuation by means of the central body is decoupled by at least partly arranging the central body in the inlet at least in part from sound attenuation in the interior of the housing in the region of the flow channel. It is imaginable for the central body to be positioned fully within the inlet where it even projects into a connecting region of the auxiliary power unit. This results in complete decoupling while maintaining an unchanged installation space of the silencer.

In the design of such silencers, optimizing or maximizing energy transmission of slightly attenuated plane waves to form transversal waves that may be sound attenuated in a significantly better manner provides a challenge. In silencers optimized in this manner it may also occur that due to a resonance phenomenon a first radial mode in the silencer downstream of the auxiliary power unit is excited. The integration according to an embodiment of the invention of the central body may significantly reduce this effect. By adjusting the natural frequency of the inner cells formed in the central body to the first radial mode of a standing wave in the silencer a high flow speed through the wall material of the casing of the central body is caused so that, as a result of this, acoustic energy is reduced, as is excitation of the radial mode.

The silencer according to an embodiment of the invention attenuates exhaust gas noises of an auxiliary power unit significantly better than do conventional silencers for auxiliary power units, which silencers operate according to a similar principle with a porous flow channel and cells formed around the flow channel.

In an advantageous embodiment the casing of the central body comprises a porous material. In this manner an even provision of a defined flow resistance to reduce acoustic energy within the central body is provided. The porous material may be designed in various ways, for example from a type of metal felt or similar heat-stable and gas-permeable materials. Accordingly, the casing could comprise a material that is comparable to that of the flow channel between the inlet and the outlet. In this manner an identical effect in a changing flow through the casing is generated as is the case in a changing flow through the flow channel.

In an advantageous embodiment the flow resistance R of the material of the casing of the central body corresponds to 1 to 1.5 times the basic resistance calculated by $$R = 410 \cdot \left(\frac{293}{T}\right)^{1.26} \frac{Pa}{\frac{m}{s}}$$

wherein T denotes the temperature in Kelvin (K) of the gas flowing through the silencer. Generally speaking the resistance is to be set in such a manner that both quite easily a sound-induced through-flow of the exhaust gas is made possible and the acoustic energy is at least in part converted to heat. In turn this also means that the resistance must be sufficient to convert as much acoustic energy as possible to heat. In terms of the central body the flow resistance also influences the splitting of a resonance frequency of a system formed by the flow channel and the inner cells in the central body into two separate frequencies that do not exactly correspond to the resonance frequency of the cells of the central body. As a result of this there is a tendency for somewhat less sound attenuation to be achieved than is the case without frequency splitting. Setting the flow resistance to the above-mentioned value found as a surprise results in such frequency splitting that is accompanied by optimal sound attenuation.

In an advantageous embodiment of the invention the casing is of a cylindrical design and is arranged so as to be coaxial to the flow channel, which favors the creation of symmetric transversal waves that may be more advantageously attenuated as a result of the porous flow channel.

In an advantageous embodiment of the invention the central body is at least in part aligned so as to be coaxial to the inlet. As a result of the coaxial arrangement an evenly-formed annular space between the central body and the inlet or the flow channel is formed, which space results in more even attenuation in circumferential direction.

In an advantageous embodiment a perforated walling encloses the casing. As a result of the additional use of a perforated walling, independent setting of the flow resistance for acoustic absorption and the natural frequency of the inner cells can be achieved. If no perforated wall were to enclose the casing and if the flow resistance of the casing were to be increased in order to improve absorption, the natural frequency of the inner cells would decrease. The perforated walling can thus further improve the effectiveness of the silencer according to the invention.

In an advantageous embodiment a perforated walling is arranged on the inside of the casing. This is thus the reverse design when compared to that described in the previous embodiment, wherein however the annular inflow space of the exhaust gas is not disturbed by the perforated wall.

In an advantageous embodiment an air gap is formed between the casing and the perforated walling. The air gap between the porous walling and the casing is particularly advantageous because as a result of the space between the perforation apertures of the walling and the casing, apart from a local flow through the perforation apertures of the perforated walling, a flow through practically the entire casing surface is allowed. If the perforated wall were to touch the casing, only a local flow through the perforation openings and directly adjoining casing surface regions would occur, which would, however, have a negative effect on the attenuation behavior.

In an advantageous embodiment the degree of perforation of the perforated walling is selected in such a manner that the resonance frequency of the inner cells corresponds to 0.95 to 1.05 times the first transversal natural frequency of a standing wave in the space between the inlet and the central body. Thereby, in particular, frequency splitting can be advantageously influenced.

The invention further relates to an aircraft comprising an auxiliary power unit and a silencer with the above-mentioned characteristics, wherein the inlet of the silencer is connected to an exhaust gas outlet of the auxiliary power unit.

In an advantageous embodiment the central body is connected to a turbine stator of the auxiliary power unit. In this manner a maximum extension of the silencer within the aircraft can be achieved while maintaining an otherwise unchanged provision of installation space.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their references. Furthermore, identical or similar components in the figures have the same reference characters.

DETAILED DESCRIPTION

Figure 1:
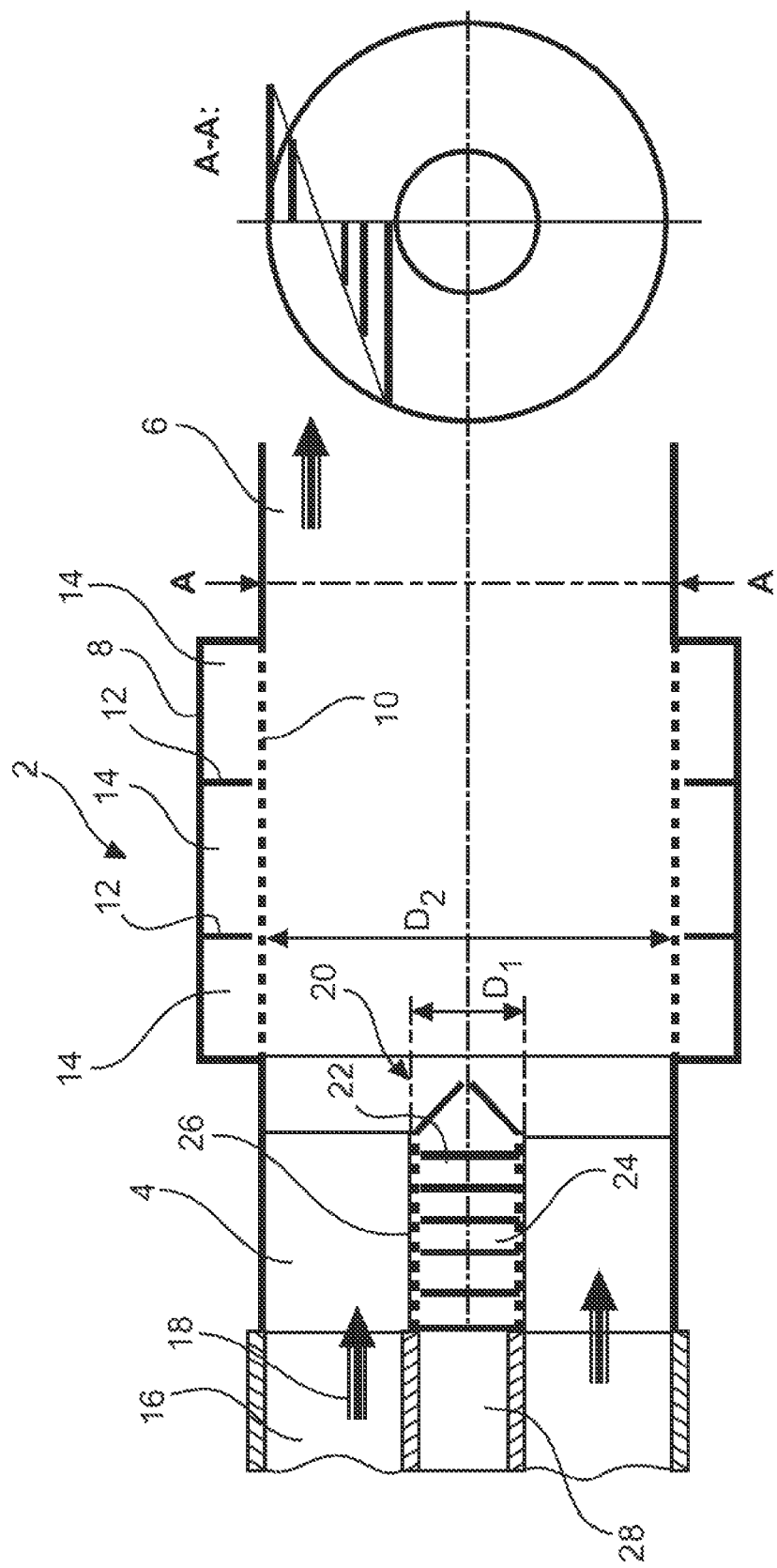
FIG. 1 shows a lateral section view of a first exemplary embodiment of the silencer according to the invention.

FIG. 1 shows a lateral section view of a silencer 2 according to an embodiment of the invention. The silencer 2 comprises an inlet 4, an outlet 6, a housing 8 situated between the inlet 4 and the outlet 6, and a flow channel 10, enclosed by the aforesaid, with a porous wall material. The housing 8 comprises several partitions 12, spaced apart from each other, that divide an intermediate space between the housing 8 and the flow channel 10 into several outer cells 14.

The inlet 4 is connected to an exhaust gas outlet 16 of an auxiliary power unit, APU. As indicated by the flow direction arrows 18, exhaust gas from the outlet 16 flows into the inlet 4, from there by way of the flow channel 10 to the outlet 6, and from there into the surroundings. The inlet and the flow channel 10 comprise, for example, the same diameter so that an even flow pattern in the transition from the inlet 4 to the flow channel 10 takes place.

During the inflow of the exhaust gas into the silencer 2 according to an embodiment of the invention resonance oscillations with several transversal modes are excited, as a result of which an alternating flow through the porous wall material of the flow channel 10 results. As a result of the transverse flow into the individual outer cells 14 when overcoming the predetermined flow resistance of the wall material of the flow channel 10, some of the acoustic energy is converted to heat so that the exhaust gas noise is reduced.

In a region of the inlet 4 a central body 20 is arranged that comprises a number of inner partitions 22, spaced apart from each other, that divide the central body 20 into inner cells 24. In addition, the inner partitions 22 are enclosed by a casing that at least in some regions is permeable to gas. This casing permits an alternating flow between the inner cells 24 and regions situated outside the casing 26.

In the design of the auxiliary power unit as a gas turbine the latter may comprise a stator 28 in the region of its exhaust gas outlet 16, to which stator 28 the central body connects so as to be flush. In this arrangement it is advantageous if the diameter of the cylindrical shell 26 of the central body 20 matches the diameter of the stator 28. Due to the stator 28, exhaust gas that flows from the exhaust gas outlet 16 of the auxiliary power unit into the silencer 2 at first has an annular flow pattern. Because of the excitation of transversal modes, sound waves also extend through the casing 26, which at least in some sections is permeable to gas, into the inner cells 24 of the central body 20, are reflected by the partitions 22, and on the opposite side of the casing 26 exit from the central body 20. Because of the flow through the casing 26, part of the acoustic energy is converted to heat.

Exhaust gas that subsequently from the annular region between the inlet 4 and/or the flow channel 10 leaves the region of the central body 20 and flows through the adjacent part of the silencer 2 will slow down somewhat because of the enlarging flow space, and in that location, because of changing flows through the flow channel 10 and because of the reflection, will be further silenced in the outer cells 14.

The section designated A-A shows an example of acoustic-pressure distribution in the annular channel between the central body 20 and the inlet 4, which acoustic-pressure distribution results from excitation of the first radial modes by a resonance phenomenon. In this arrangement the resonance frequency has the following simplified dependency:

$$f_{res} = \sim c/(D_2 - D_1) \text{ [Hz]},$$

wherein c denotes the acoustic velocity in the exhaust gas, $D_2$ denotes the outer diameter and $D_1$ the inner diameter of the channel. By means of the proposed design of the silencer this effect is reduced so that both the size and the weight of the silencer can be reduced. The maximum of the first radial mode is approximately at the level of the central body 20, so that in that location the greatest-possible alternating flow through the porous wall material 26 for achieving the best possible absorption is achieved, and the excitation of the first radial modes is reduced.

Figure 2A:
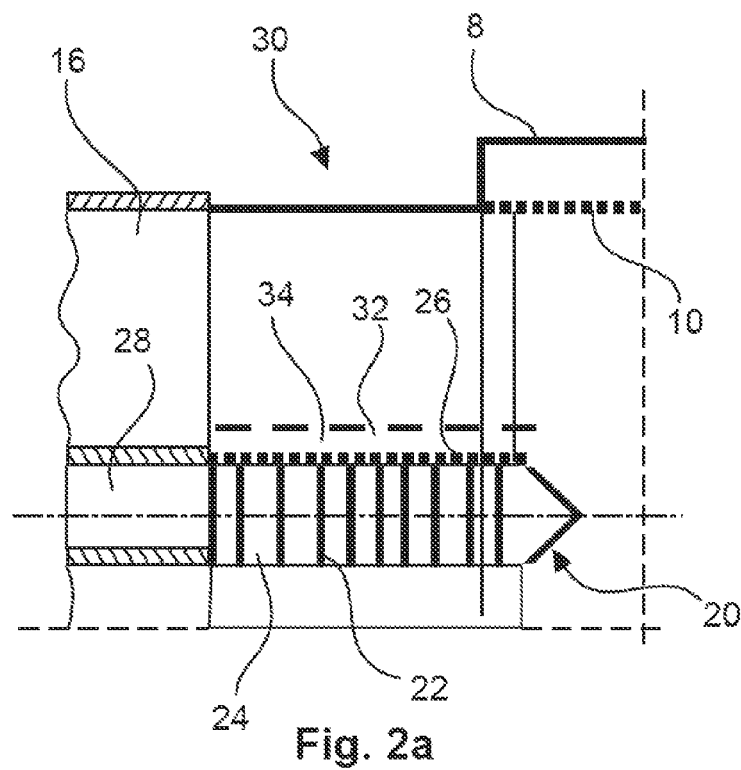
FIGS. 2a and 2b show two further exemplary embodiments of the silencer according to the invention with an additional perforated walling.

FIG. 2a shows a slight modification of this design. In addition to the characteristics from FIG. 1 a silencer 30 comprises a perforated wall 32 that maintains a certain distance from the gas-permeable casing 26 of a porous material. The gap 34 that forms in between in particular allows a complete flow through the surface of the casing 26 so that the entire surface of said casing 26 contributes to sound attenuation. Furthermore, this embodiment provides a particular advantage in the independent setting of the natural frequency of the inner cells and of the flow resistance for acoustic absorption.

Furthermore, with corresponding materials design in addition a reflection on the inside of the perforated walling 32 may occur so that as a result of this a renewed flow through the porous casing 26 is enforced. In this manner the silencing effect can be still further increased.

Figure 2B:
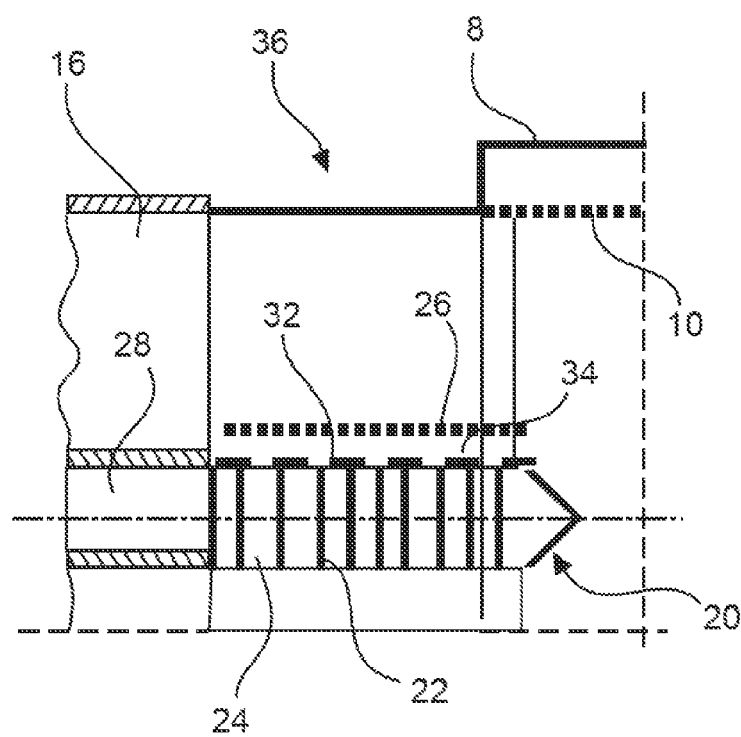

As an alternative to this, as shown in FIG. 2b, the positions shown in FIG. 2a of the perforated walling 32 and of a porous casing 26 may be changed over so that the perforated walling 32 directly follows on from the partitions 22 and at a particular distance from it the porous casing 26 extends. As a result of this the reflections in the inner cells 24 tend to be intensified, while the sound emanating from the perforated wall 32 flows through the porous casing 26 for further silencing.

Figure 3:
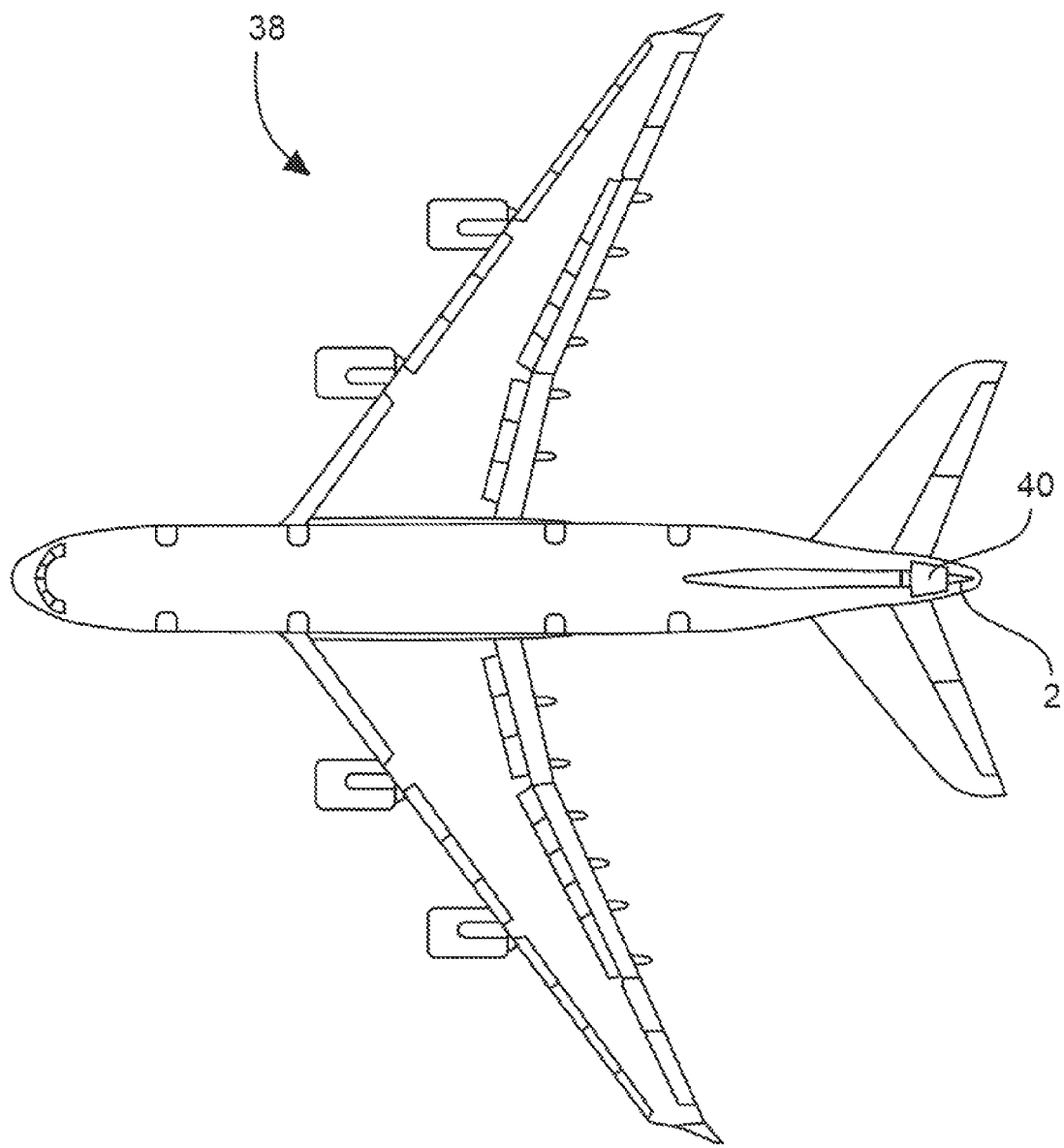
FIG. 3 shows an aircraft comprising an auxiliary power unit and a silencer according to the invention.

Lastly, FIG. 3 shows an aircraft 38 which in a tail cone comprises an auxiliary power unit 40 which is followed downstream by a silencer 2. The latter results in improved sound attenuation of the exhaust gas stream from the auxiliary power unit and allows low-noise operation on the ground.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A silencer for an auxiliary power unit of an aircraft, comprising
   a longitudinal inlet section;
   an outlet;
   a housing downstream of the inlet section;
   a flow channel, arranged in the housing, comprising a porous wall material;
   wherein between the housing and the flow channel an intermediate space is created, the intermediate space being divided by at least one outer partition into at least first and second outer cells arranged around the flow channel, and
   a central body comprising a casing permeable to gas in at least in one region, the central body being arranged in the interior of the inlet section and upstream of the flow channel and the at least first and second outer cells and comprising a plurality of inner partitions dividing the central body into a plurality of inner cells,
   wherein the resonance frequency of the inner cells corresponds to the natural frequency of the first radial mode in a channel formed between the central body and the inner surface of the inlet.

2. The silencer of claim 1, wherein the casing of the central body comprises a porous material.

3. The silencer of claim 1, wherein the flow resistance R of the material of the casing of the central body corresponds to 1 to 1.5 times the basic resistance calculated by $$R = 410 \cdot \left(\frac{293}{T}\right)^{1.26} \frac{Pa}{\frac{m}{s}}$$

wherein T denotes the temperature in Kelvin (K) of the gas flowing through the silencer.

4. The silencer of claim 1, wherein the casing is cylindrical and is arranged so as to be coaxial to the flow channel.

5. The silencer of claim 1, wherein the central body is at least in part aligned so as to be coaxial to the inlet section.

6. The silencer of claim 1, further comprising a perforated walling enclosing the casing.

7. The silencer of claim 1, further comprising a perforated walling arranged on the inside of the casing.

8. The silencer of claim 6, further comprising an air gap between the casing and the perforated walling.

9. The silencer of claim 6, wherein the degree of perforation of the perforated walling is configured such that the resonance frequency of the inner cells corresponds to 0.95 to 1.05 times the first transversal natural frequency of a standing wave in the space between the inlet section and the central body.

10. An aircraft comprising an auxiliary power unit and a silencer, the silencer comprising:
- a longitudinal inlet section;
- an outlet;
- a housing downstream of the inlet section;
- a flow channel, arranged in the housing, comprising a porous wall material,
- wherein between the housing and the flow channel an intermediate space is created, the intermediate space being divided by at least one outer partition into at least first and second outer cells arranged around the flow channel, and
- a central body comprising a casing permeable to gas in at least in one region, the central body being arranged in the interior of the inlet section and upstream of the flow channel and the at least one first and second outer cells and comprising a plurality of inner partitions dividing the central body into a plurality of inner cells,
- wherein the resonance frequency of the inner cells corresponds to the natural frequency of the first radial mode in a channel formed between the central body and the inner surface of the inlet; and
- wherein the inlet of the silencer is connected to an exhaust gas outlet of the auxiliary power unit.

11. The aircraft of claim 10, wherein the central body is connected to a turbine stator of the auxiliary power unit.

* * * * *